June 15, 1971
G. H. ERB
3,584,338
APPARATUS FOR MOLDING PLASTIC SHAPES IN MOLDING RECESSES FORMED IN MOVING ENDLESS WIRE DIES
Filed July 10, 1969      4 Sheets-Sheet 1

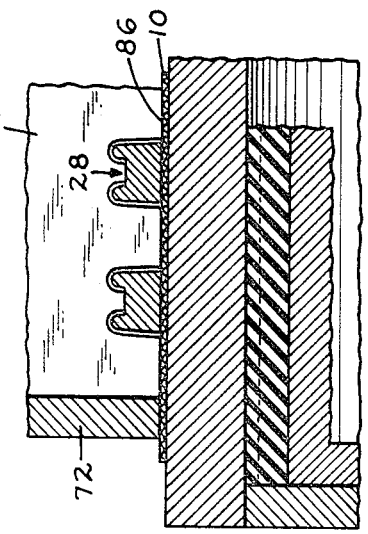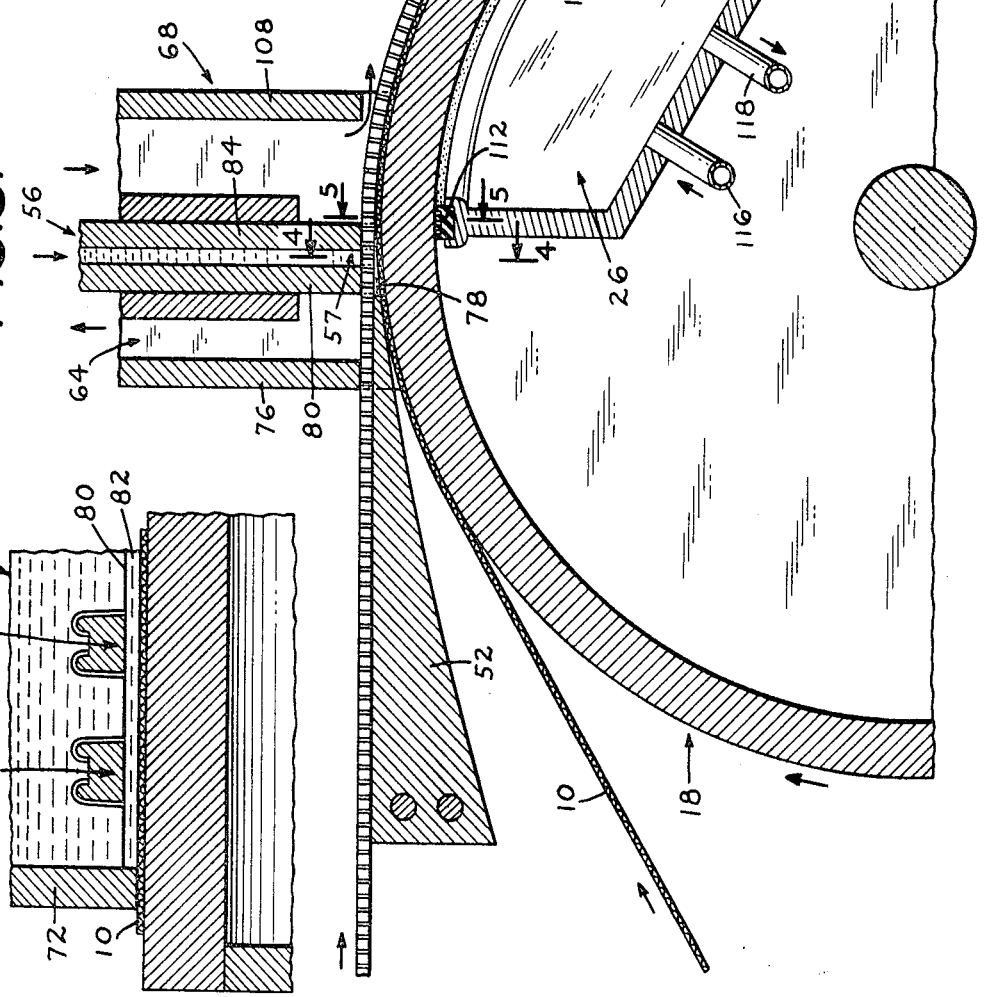

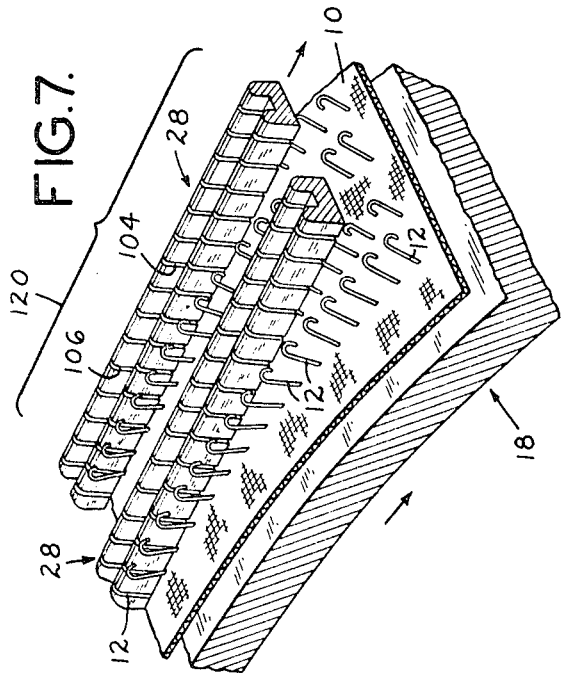
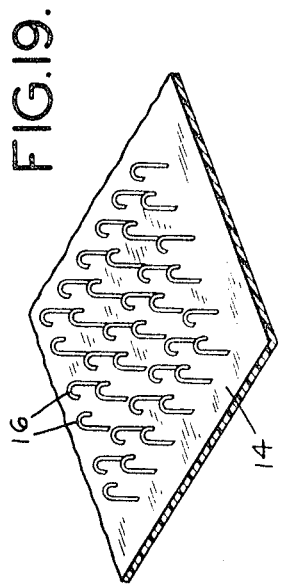
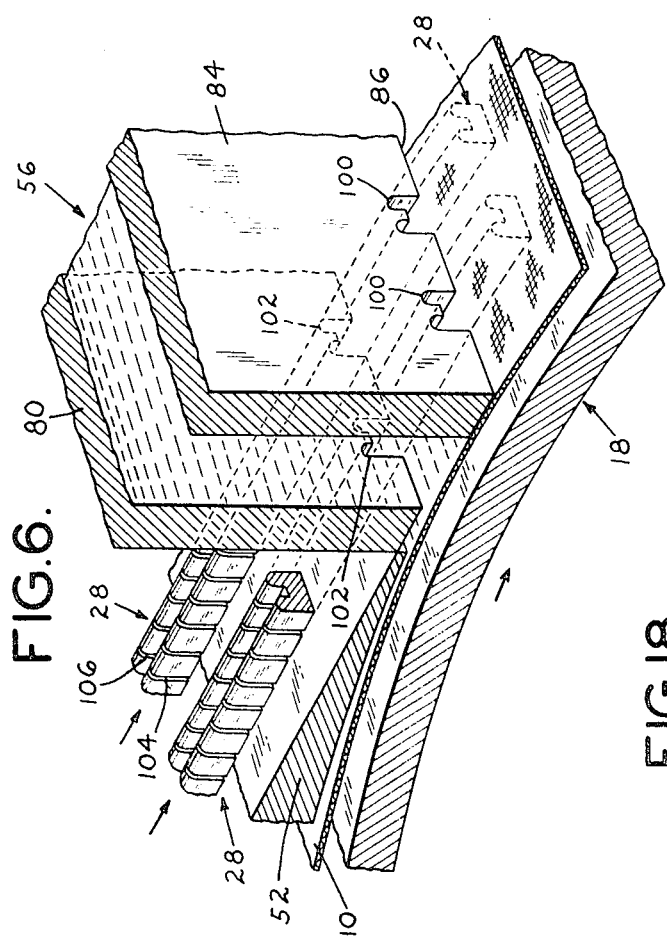
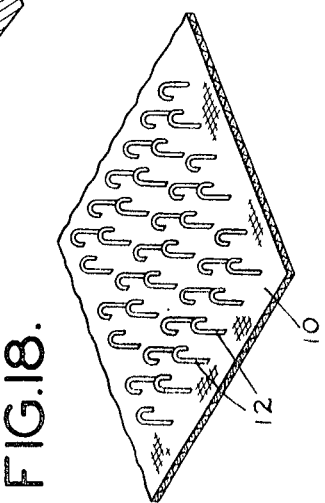

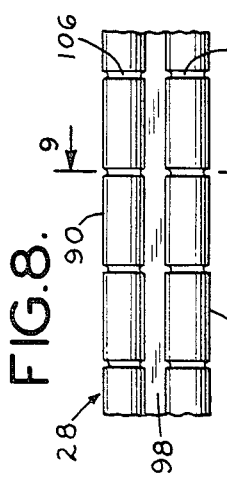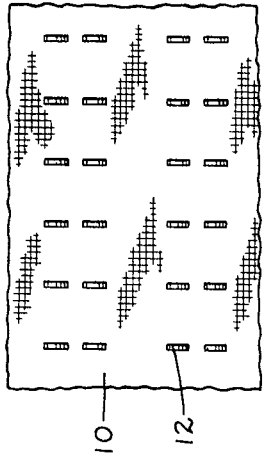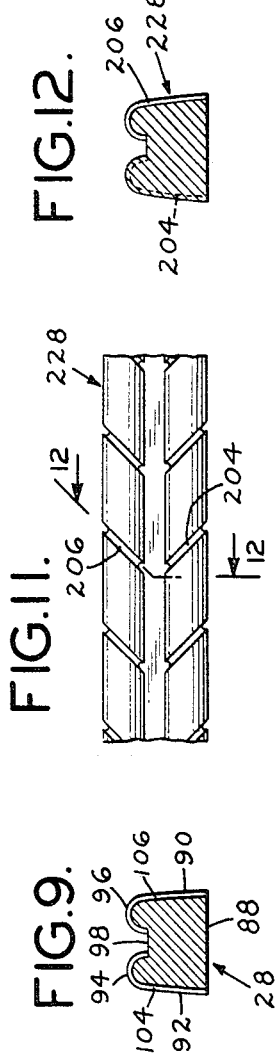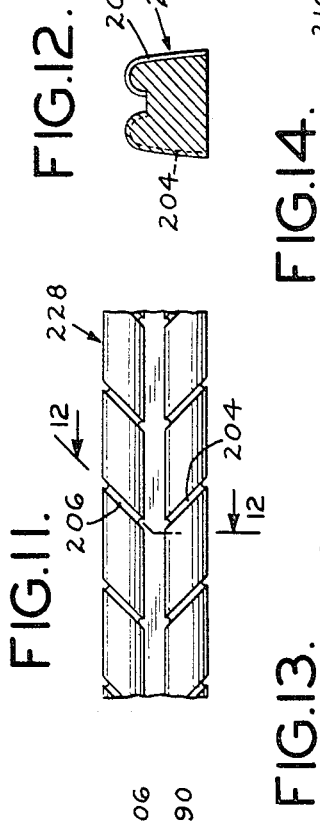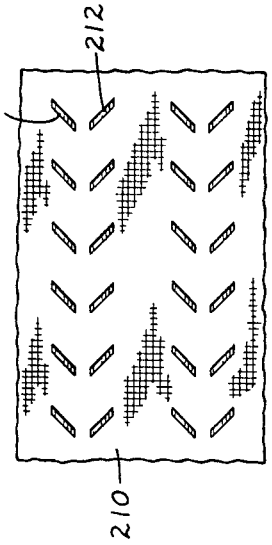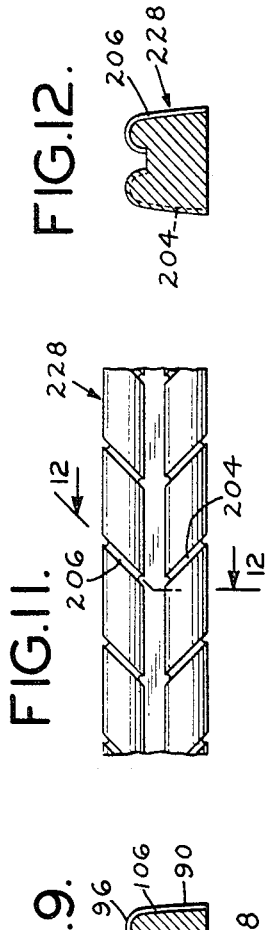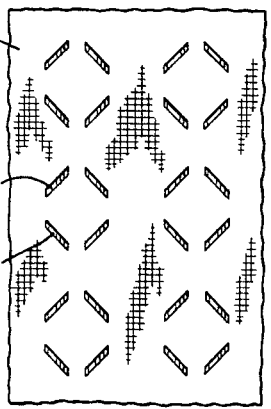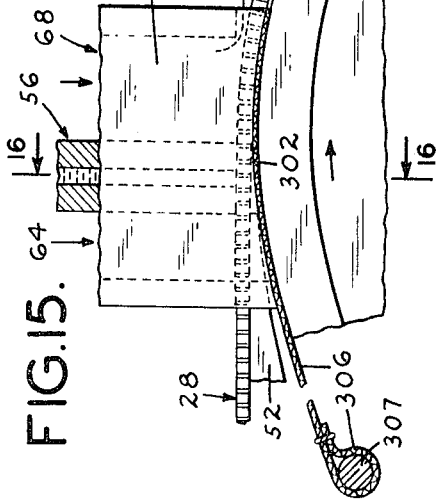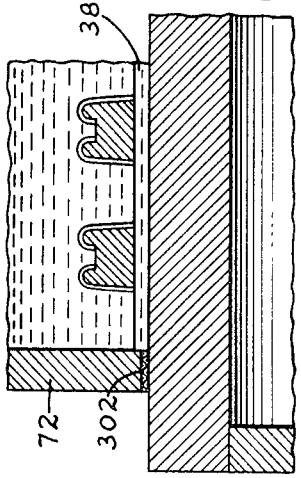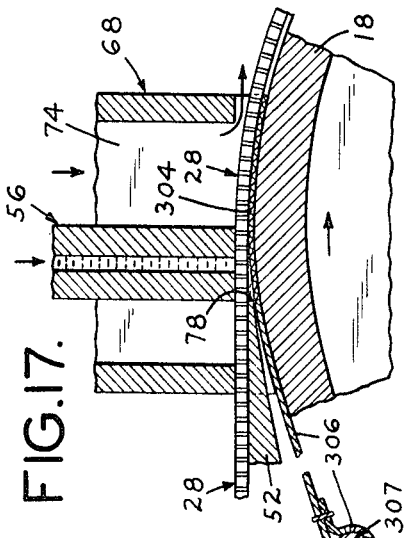

United States Patent Office

3,584,338
Patented June 15, 1971

---

3,584,338
APPARATUS FOR REMOVING EXCESS MATERIAL FROM THE OPEN END OF HOLLOW OBJECTS HAVING RELATIVELY LARGE OPENINGS
Stefan Fischer, Im Korresgarten 21, and Rainer Fischer, Am Wildtor 2, both of Lohmar, near Cologne, Germany
Filed Oct. 3, 1968, Ser. No. 764,819
Claims priority, application Germany, Oct. 3, 1967,
P 17 04 047.0
Int. Cl. B29c *17/07*
U.S. Cl. 18—5         10 Claims

ABSTRACT OF THE DISCLOSURE

This invention relates to method and apparatus for removing the excess material from the open end of hollow objects having relatively large openings and made from thermoplastic material in a blow-moulding process, by cutting off such excess material by means acting from the inside of the container outward against the interior walls of the blowing mould.

BACKGROUND OF THE INVENTION

This invention relates generally to the production of hollow articles from thermoplastic synthetic plastics material by the blow-moulding process, in which a tubular preform as from an extruder is inflated in a blow mould to form the finished article and any excess material present is cut off in the blow mould.

More specifically, the invention is primarily concerned with the production of wide-necked vessels, that is vessels having a relatively large neck or filling opening, which in many cases must be produced with what is called a "throw-away head," that is to say in the production of which a head piece has to be cut away after the pre-form or parison has been inflated.

Various devices have become known which permit the cutting away of the head piece in the mould. However, these known devices do not permit of achievement of fully satisfactory products. This is primarily due to the fact that to cut away the head piece a cutting pressure is exerted from the exterior upon the still deformable article in the blow mould, whereby a certain deformation of the article at the cutting point easily occurs.

SUMMARY OF THE INVENTION

This invention is intended primarily to eliminate these drawbacks and difficulties. According to the present invention, in a process for the production of hollow articles from thermoplastic synthetic plastics material by the blowing process, in which a tubular pre-form is inflated in a blow mould to form the finished hollow article and any excess material present is cut away in the blow mould, these drawbacks and difficulties are avoided due to the fact that the cutting away of the excess material is effected by pressure exerted from the inside of the hollow article upon the material resting against the mould wall. In this case, the pressure can be exerted simultaneously on the whole cutting line and if desired, gradually increased. However, the pressure can also be exerted at points or lengths, progressively around the periphery, and at the same time gradually increased until the material is cut through.

Furthermore, the invention provides an apparatus for the production of hollow articles from thermoplastic synthetic plastics material by the blow-moulding process, which is especially suitable for carrying out the process above described and comprises a blow mould having devices for the inflation of a formable tubular piece of thermoplastic synthetic plastics material and cutting-off devices for excess material, wherein according to the invention the cutting-off device may be brought into the internal space of the hollow article and thence movable outwards against the mould wall. A cutting blade may serve here as the cutting-off device and may be introduced into the hollow interior of the article through the blowing opening and be movable to the cutting position against the mould wall and then set in rotation. The cutting depth may be controlled and increasing, for example from one revolution to the next until the mould wall is reached. The cutter can possibly here be replaced by a cutting roller. Such forms of embodiment are usable especially when the cutting-off of the excess material can take place against a smooth surface rather than against a profiled surface. In other cases, a squeeze-off edge can be provided in the blow mould along the line of cutting and a squeeze-off roller introduced from the interior of the hollow article, which roller may be brought to abut against the squeeze-off edge and set in rotation along the squeeze-off edge, thus cutting away the excess material along the squeeze-off edge.

In a preferred embodiment of an apparatus according to this invention, the blowing head may be provided with a longitudinally extending through opening in which a spindle may be located and mounted for rotation relative thereto. Further means may be provided for reciprocating said spindle vertically up and down within said blowing head. A lever is pivotally mounted at the one end of the spindle adjacent the blowing mould for movement up and down with said spindle into an interior of the hollow article. The free end of the lever carries a squeeze-off roller that may be rotated independently of and relative to said lever. Said roller may be brought into abutment with the squeeze-off edge of the mould so that upon rotation of the squeeze-off roller and pressure against the squeeze-off edge, the excess material will be severed from the finished article. Such pressure may be accomplished by either centrifugal force or by a mechanical linkage, preferably variable to directly apply such force.

The invention permits of many possible embodiments.

The invention will be explained in greater detail hereinafter by reference to a form of embodiment of an apparatus permitting of carrying out the process according to the invention, which is illustrated by way of example, with the parts essential to understanding, in the accompanying drawing.

BRIEF DESCRIPTION OF THE DRAWING

The accompanying drawing is a partial sectional elevational view showing one form of the apparatus of this invention in combination with adjacent portions of a blowing head and a blowing mould.

DESCRIPTION OF THE PREFERRED EMBODIMENT

Figure 1:
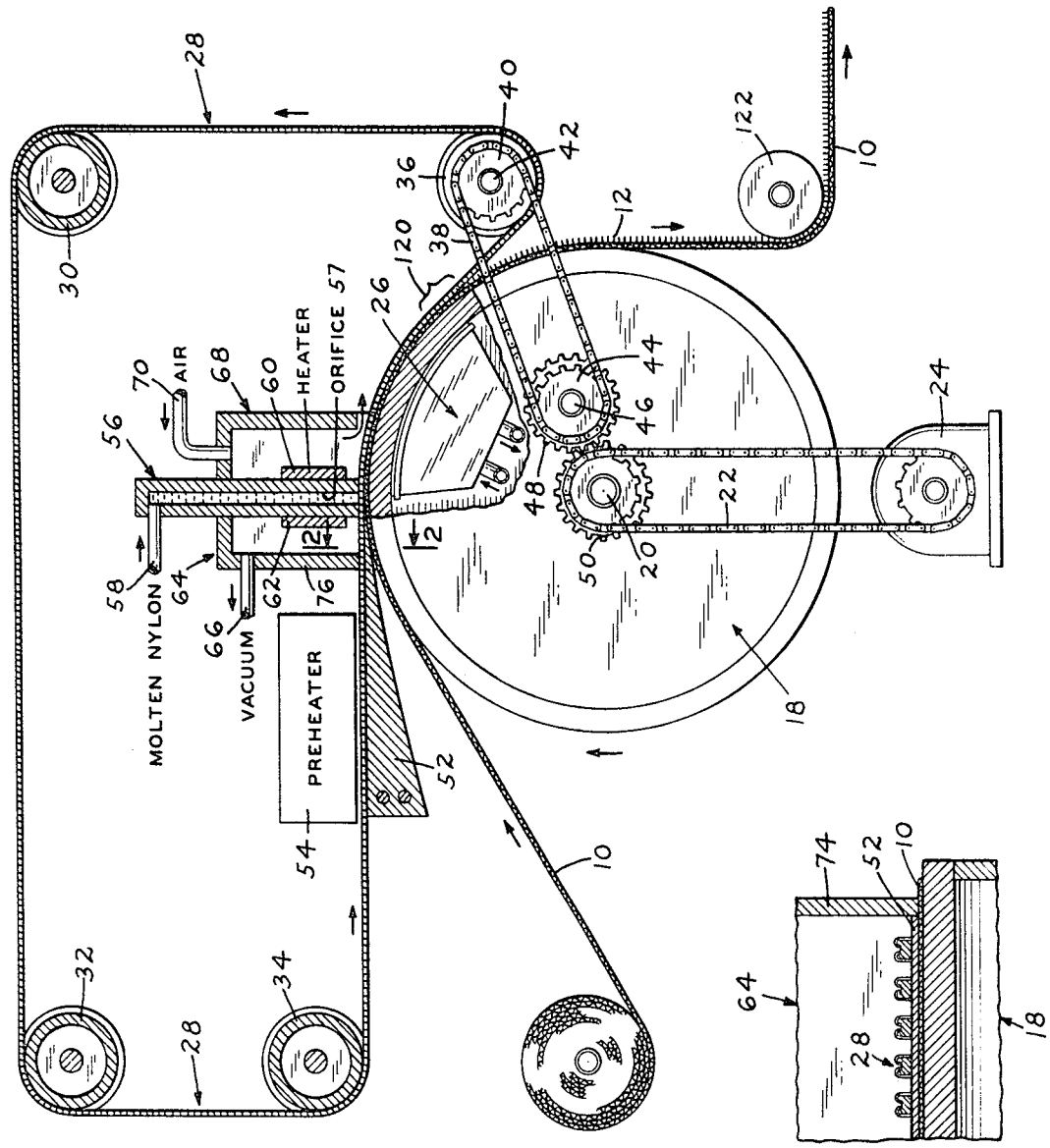
Figure 2:
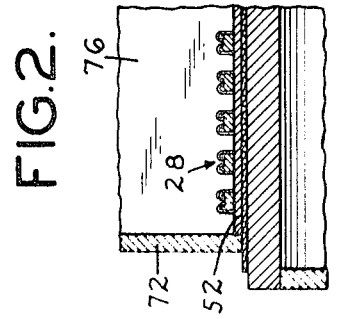

In the drawing, 11 designates a blow mould which serves for the production of a thin-walled vessel having a comparatively large filling opening, the diameter of which approximately approaches the diameter of the vessel. The mould is formed as usual from two mould halves movable together and apart from one another, which when in the closed position leave a conical opening 12 at their upper end.

The tubular portion or parison, after the closing of the mould halves 11 will be expanded against the walls of the mould to form the finished article. The open end of such article, after such inflation, will expand against and lie against the walls of the opening 12. More particularly, the inflation of the tubular piece or parison, is accomplished by means of the introduction of fluid under pressure from the blowing head 13 to the interior of the parison through the conical mould opening 12. The blowing head 13 is provided with a conical shaped nozzle 14 which during the blowing process, is lowered in to close juxtaposition with the conical opening 12 of the mould so that a substantially airtight closure is created between the two parts.

The blowing head 13 is provided with a central bore 15 extending through its conical shaped nozzle 14. The bore 15 may be chamfered at its open end adjacent the mould, as at 16. A spindle 20 extends longitudinally in said central bore 15 and will be mounted in known manner for both up and down vertical movement and rotary movement. A rocker arm or lever 18 is pivotally connected at the end of the spindle adjacent the blowing mould 11 as by a pin 19. A cut-off roller 17 having two tapered surfaces 21 forming an edge 22 is rotatably mounted at the free end of the lever 18. As soon as the blow head 13 is seated with its connection nozzle 14 in the opening 12 of the mould, the spindle 20 descends so that the roller 17 clears the bore 15 and blowing air can flow through the bore 15 into the interior of the tube, until the tube lies against the mould wall. Simultaneously therewith or thereupon the spindle 20 descends further until finally a position is reached in which a projection 181 of the lever 18 places itself against a stop ledge 141 on the inside of the nozzle 14. On further lowering of the spindle 20 the lever 18 with the roller 17 is pivoted out of the axis of the spindle 20. As soon as the downward movement of the spindle 20 has reached the intended end position, it is caused to rotate. The speed of the spindle may, of course, be variable, for example, by being driven by a variable speed motor. The occurring centrifugal force further lifts the level 18 with the roller 17 on its free end so that the roller 17 places itself against the material resting on the squeeze-off edge 111 and after one or more revolutions cuts off the excess material along this edge. It will be apparent to those skilled in the art, that if it is desired to dispense with the centrifugal action, it is possible to modify the dimensions of the parts to one another in such a way that the roller 17 is lifted by means of the projection 181 so far that it places itself against the squeeze-off edge.

It will be apparent to those skilled in the art that many modifications, changes and improvements may be made to the invention without departing from the spirit and scope thereof as defined in the appended claims.

What is claimed is:

1. Apparatus for the production of hollow articles in a mold from thermoplastic material by the blow process, comprising blow nozzle means for inflating a deformable tubular piece of thermoplastic material, means for cutting-off excess material, pivotable lever means for introducing said cutting-off means into the interior of said hollow article, substantially below said blow nozzle means and means for revolving said cutting-off means against the interior wall of the mold to remove the excess material therefrom.

2. Apparatus in accordance with claim 1 wherein said inflating means is operative to form a squeeze-off edge within said tube, said cutting-off means including roller means operative to abut said squeeze-off edge to cause the removal of said excess material therefrom.

3. Apparatus in accordance with claim 1 wherein said inflating means is operative to form a squeeze-off edge within said tube, said cutting-off means including roller means operative to abut said squeeze-off edge to cause the removal of said excess material therefrom.

4. Apparatus in accordance with claim 3 wherein said squeeze-off edge is defined by a ledge formed in the blow mould.

5. Apparatus in accordance with claim 1 including means to vary the force applied to said cutting means.

6. Apparatus in accordance with claim 5 wherein said variable means is operative to vary the speed of rotation of said rotating means.

7. Apparatus for the production of hollow articles from thermoplastic material by the blow process, comprising a blow head, blow mould adapted to be placed in close juxtaposition to said head, a vertical spindle rotatably mounted to said head, a lever pivotally mounted at one end to the lower end of said spindle, a cutting-off roller secured to the other end of said lever, means for lowering said spindle to place said lever within said blow mould, means to rotate said spindle thereby causing rotational movement of said lever and said cutting-off means.

8. Apparatus in accordance with claim 7 wherein said lever includes a projection and said blow head includes a ledge adapted to engage said projection upon the lowering of said spindle, whereby said lever and cutting-off roller will be pivoted toward the wall of said mould.

9. Apparatus in accordance with claim 7 wherein said cutting-off roller is rotationally secured to said lever.

10. Apparatus in accordance with claim 7 including means to vary the rotational speed of said spindle.

References Cited
UNITED STATES PATENTS

| 1,850,327 | 3/1932 | Makowski | 25—105 |
| 2,544,254 | 3/1951 | Child | 25—39 |
| 2,770,861 | 11/1956 | Schmunk | 25—105X |
| 3,209,401 | 10/1965 | Mehnert | 18—5(BS) |
| 3,224,038 | 12/1965 | Budesheim | 18—5(BQ) |
| 3,278,665 | 10/1966 | Harrison | 18—5(BA) |
| 3,391,588 | 7/1968 | Brown | 83—914X |

J. SPENCER OVERHOLSER, Primary Examiner

B. D. TOBOR, Assistant Examiner

U.S. Cl. X.R.

25—105; 83—914